United States Patent [19]

Osborn

[11] 4,329,161
[45] May 11, 1982

[54] VALVE SYSTEM FOR VACUUM CLEANER

[76] Inventor: Jack Osborn, 6216 S. Lewis, Tulsa, Okla. 74136

[21] Appl. No.: 264,870

[22] Filed: May 18, 1981

[51] Int. Cl.³ .............................................. B01D 46/04
[52] U.S. Cl. ......................................... 55/96; 55/302; 55/472; 55/DIG. 3; 15/352
[58] Field of Search .................... 55/96, 293, 302-303, 55/472, DIG. 3; 15/352

[56] References Cited

U.S. PATENT DOCUMENTS

| | | | |
|---|---|---|---|
| 1,168,543 | 1/1916 | Newhouse | 55/96 |
| 2,633,206 | 3/1953 | Bruckner | 55/293 X |
| 2,682,316 | 6/1954 | Kaufmann | 55/293 X |
| 3,008,542 | 11/1961 | Steele . | |
| 3,078,646 | 2/1963 | Leech et al. | 55/303 X |
| 3,080,694 | 3/1963 | Smith | 55/293 X |
| 3,540,193 | 11/1970 | Pausch | 55/302 X |
| 3,653,190 | 4/1972 | Lee et al. | 55/302 |
| 3,680,285 | 8/1972 | Wellan et al. . | |
| 3,765,152 | 10/1973 | Pausch . | |
| 3,868,237 | 2/1975 | Berz | 55/293 X |
| 4,007,026 | 2/1977 | Groh . | |

FOREIGN PATENT DOCUMENTS

| | | | |
|---|---|---|---|
| 2531461 | 2/1977 | Fed. Rep. of Germany | 55/293 |
| 169692 | 12/1921 | United Kingdom | 55/302 |
| 546878 | 8/1942 | United Kingdom | 55/302 |
| 1215364 | 12/1970 | United Kingdom | 55/302 |

OTHER PUBLICATIONS

"Hoffman Vacumatic Dust Separator," Osborn Equipment Sales, Inc., Tulsa, Oklahoma, Bulletin AS-V-127A, 5-78.

Primary Examiner—Kathleen J. Prunner
Attorney, Agent, or Firm—Head & Johnson

[57] ABSTRACT

An improved valve system for creating reverse pulses of air through the filter element of a vacuum cleaner in order to shake and drive collected dust from the filter element during operation of the vacuum cleaner, by equipping the vacuum cleaner with a valved conduit downstream from the filter element and upstream from the inlet (vacuum side) of the exhauster wherein the valve consists of a pair of movable rigid sealing surfaces adapted to rotate about a single axis positioned such that one rigid surface opens outwardly towards the exterior of the conduit against the pressure gradient while the other rigid surface opens inwardly towards the interior of the conduit assisted by the pressure gradient. By selecting the respective surface areas of the openings being covered by each valve surface, the resistance associated with the outwardly pivoting surface is counteracted by the force of the inwardly movable surface such that the valve can easily and repeatedly be manually actuated inducing a series of reverse pulses of air through the filter element.

10 Claims, 8 Drawing Figures

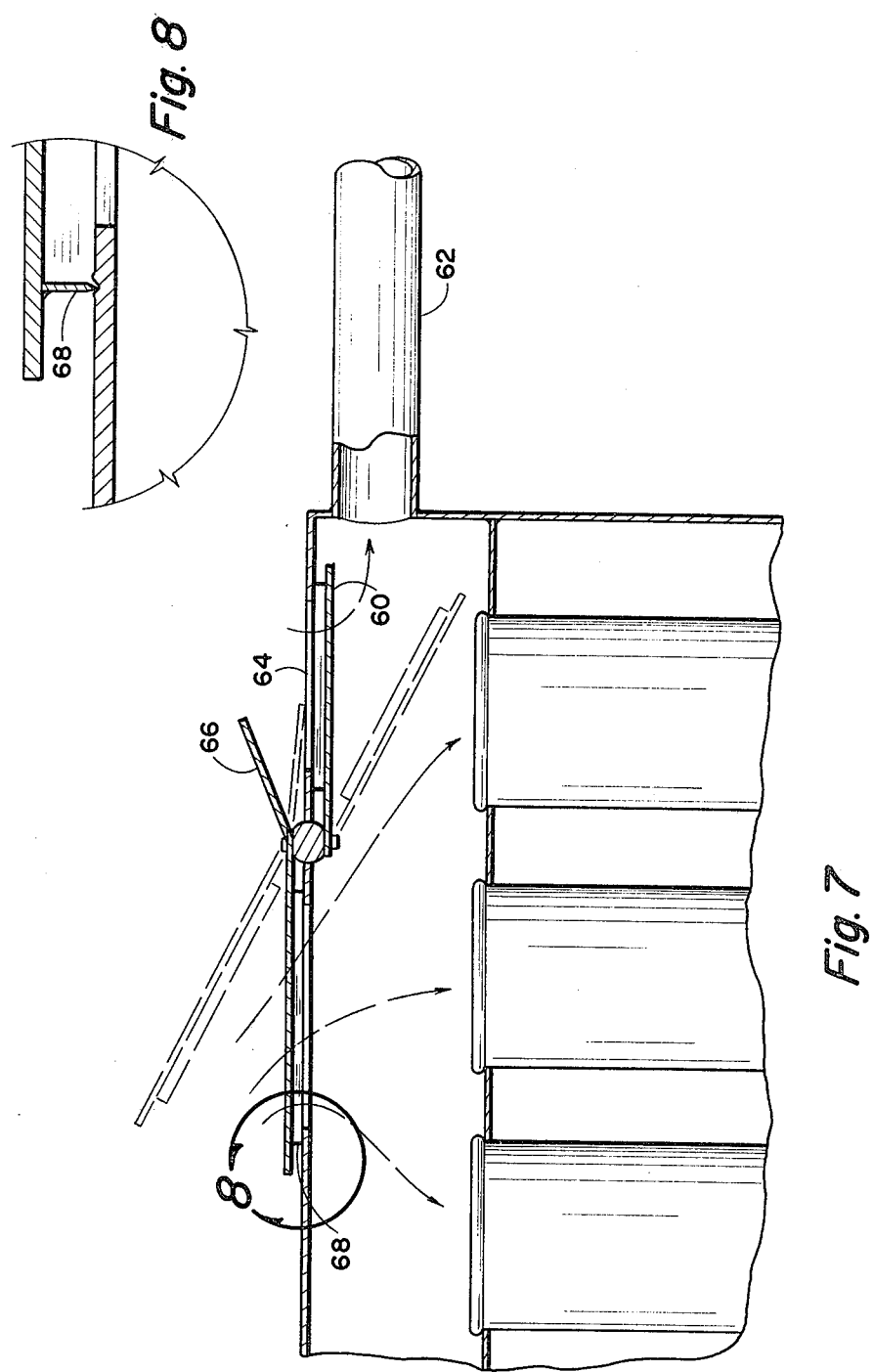

VALVE SYSTEM FOR VACUUM CLEANER

BACKGROUND OF THE INVENTION

1. Field of the Invention

This invention relates to vacuum cleaners and the removal of accumulated dust on the filter element during operation of the vacuum cleaner. More specifically, the invention relates to a valve system for creating or inducing reverse pulses of air through the filter element in order to shake and drive collected dust from the filter element.

2. Description of the Prior Art

Vacuum cleaners and in particular commercial scale vacuum cleaners involving a large tank wherein filter elements in the form of fabric bags or sleeves inserted in or mounted to a plate which divides the tank into two chambers are well known and commonly used. Dust-laden air is directed into one of two chambers and is filtered as it is drawn through the filter elements into the other dust-free chamber by the action of an exhauster attached to the clean air containing chamber. Periodically the accumulated dust on the filter elements must be removed by shaking or reversing the direction of air flow through the filter elements. Various methods have been proposed to accomplish this task including disassembling the cleaner tank and physically shaking the filters to elaborate systems for injecting compressed gas through the filters.

In U.S. Pat. No. 3,008,542 a pair of squirrel cage blowers direct the dust-laden air through the blowers into a set of valved pipes and then to a dust removal stage. By virtue of switching these valves the air flow was reversed for removal of dust deposits. In contrast, U.S. Pat. No. 3,680,285 discloses a tubular filter bag-type cleaner wherein a flushing system with external pilot-controlled, pressure-activated diaphragms having rows of ejector tubes, one for each bag, is employed to discharge pressurized air in addition to a back-flow of air from the clean air section to remove dust. Similarly, in U.S. Pat. No. 3,765,152, reverse flow of air through filter bags in order to maintain permeability of the porous filter media is accomplished by a gas distribution system which injects a jet of compressed air through venturi tubes that project into each bag. In U.S. Pat. No. 4,007,026 a method of creating air pulses to clean filter cartridges without venturi tubes is disclosed involving a compressed gas manifold suspended over the openings in the filter cartridges with an orifice directed at each opening. For further references and details of a multitude of various prior art devices see U.S. Pat. No. 4,007,026 which is herein incorporated by reference for that purpose.

In U.S. Pat. No. 3,653,190 an apparatus for reversing the direction of air flow through the fabric filter bags which shakes the dust from the bags is disclosed wherein a pair of synchronized valves are employed to close the inlet side of the exhauster and open the clean air side of the filter bags into the atmosphere. This system requires extraordinary force to actuate valves large enough to accomplish this task particularly in commercial scale vacuum cleaners. The present invention deals with this type of system and is considered an improvement thereof.

SUMMARY OF THE INVENTION

In view of the above mentioned problems, I have discovered a vacuum cleaner having a dust-laden air chamber provided with an inlet for dust-laden air and communicating with a dust-free air chamber through a filter element wherein an exhauster communicating with the dust-free chamber through a conduit causes the air to be drawn through the filter element during operation, the improvement comprising a valve system for creating reverse pulses of air through the filter element, the valve system comprising:

(a) a valve axis mounted to the conduit;
(b) a pair of openings in the conduit on opposite sides of the mounted valve axis; and
(c) a pair of essentially rigid valve surfaces mounted to pivot about the valve axis and to open and close the openings in a manner such that the openings are normally closed during operation of the vacuum cleaner and open when accumulated dust is to be removed from the filter element, the valve surfaces being interconnected so that when the openings are open one of the valve surfaces opens outwardly towards the exterior of the conduit against the pressure gradient existing between inside and outside of the conduit during operation of the vacuum cleaner and the other valve surface opens inwardly towards the interior of the conduit assisted by the pressure gradient so that air is admitted through the openings to provide a reverse pulse of air to remove the accumulated dust from the filter element. Alternately the valve system can be mounted in the top or sidewalls of the dust-free chamber rather than the conduit.

The present invention further provides for the inwardly opening rigid valve surface to be mounted to the valve axis on the side closest to the exhauster and to be adapted to direct air towards the exhauster when opened. In one embodiment of the invention the conduit then bends downward through an angle of approximately 90° after exiting the dust-free chamber and before the exhauster inlet. In this embodiment the valve axis is mounted at the outer edge of the angle with the outwardly pivoting valve surface being essentially horizontal and the inwardly pivoting valve surface being essentially vertical. To further assist in promoting an airtight seal the valve surfaces are provided with a layer of elastomeric or other appropriate gasket material and optionally the conduit will have a raised lip around the openings to contact the gasket material.

A primary object of the present invention is to provide a simple, reliable, and inexpensive valve system for reversing the flow of air through the filter elements of a vacuum cleaner during operation in such a manner that the accumulated dust will be shaken and driven off the filter media. It is an associated object that this valve system be operable with the application of very little external force even when large commercial scale units requiring significant air flow and correspondingly large valve openings are involved. It is a further object that the process be such that it can be mechanically and/or manually initiated repeatedly thus producing a series of reverse pulses and shock waves to shake the dust loose. And, it is an object of the present invention to have this process occur quickly and easily even when using large openings. Fulfillment of these objects as well as the presence of other objects will be obvious upon reading of the complete specification and claims taken in conjunction with the attached drawing.

BRIEF DESCRIPTION OF THE DRAWING

FIGS. 7 and 8 illustrate an alternate embodiment of the valve system of the present invention.

DESCRIPTION OF THE PREFERRED EMBODIMENTS

Figure 1:
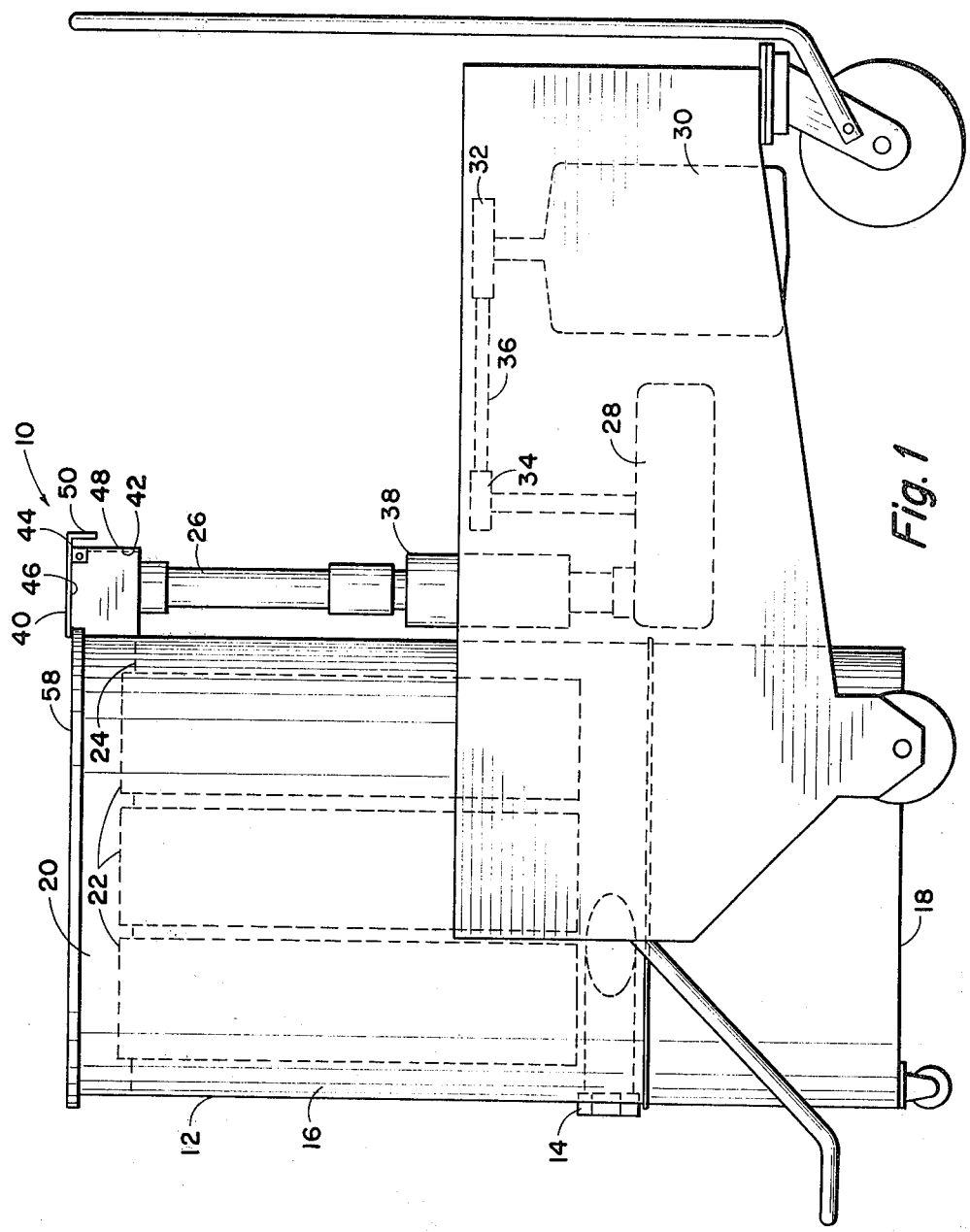
FIG. 1 is a side view of a portable commercial type vacuum cleaner incorporating the novel valve system of the present invention.
Figure 2:
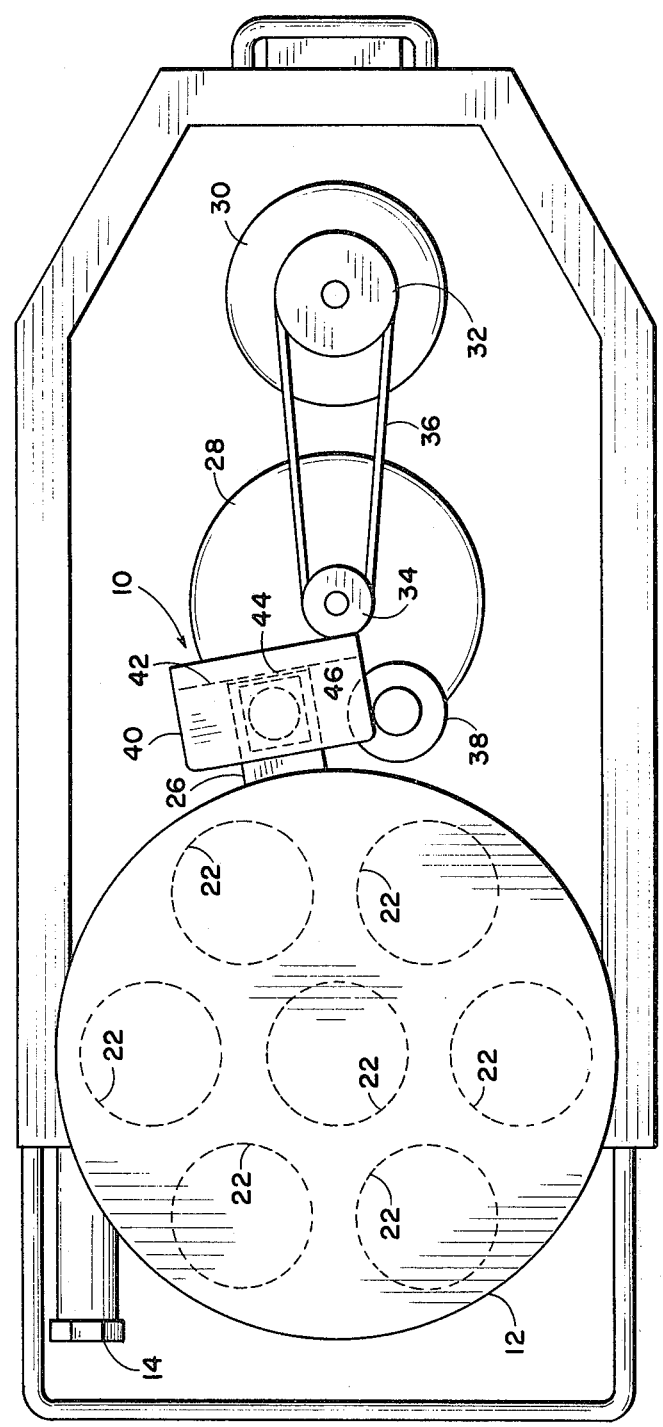
FIG. 2 is a top view of the vacuum cleaner of FIG. 1.

The improved valve system of the present invention, how it relates to the overall vacuum cleaner, and how it operates can perhaps be best explained and understood by reference to the accompanying drawing. FIGS. 1 and 2 illustrate how the overall valve system of the present invention, represented by numeral 10, fits into a commercial type vacuum cleaner. During operation air, dust and debris are sucked into cylindrical tank 12 through a flexible hose and attachments (not shown) which is inserted into the vacuum cleaner inlet nozzle 14. This inlet nozzle 14 empties into tank 12 at dust-laden chamber 16 wherein heavy particles and debris drop to the bottom of the tank 12 and are trapped in a removable bottom storage section 18. As shown, the top of cylindrical tank 12 is a dust-free chamber 20 separated from dust-laden chamber 16 by a plurality of filter elements 22 mounted in separation plate 24.

The dust-free air in chamber 20 is withdrawn at the top of tank 12 through conduit 26, containing valve system 10, and is thus delivered to the inlet side of exhauster 28 (see FIG. 2). Exhauster 28 is driven by electric motor 30 coupled to the exhauster 28 through a series of pulleys 32 and 34 and belt 36. The air passing through the vacuum cleaner then exits the exhauster 28 back to the atmosphere through silencer 38.

The preferred valve system 10, as illustrated, comprises a pair of rigid valve surfaces 40 and 42 attached to a valve axis 44 rotatably mounted to conduit 26. The valve surfaces 40 and 42 are attached to valve axis 44 at essentially a fixed 90° angle to each other and are adapted to either simultaneously close the openings 46 and 48, respectively, in conduit 26 or open both simultaneously. In this case, valve system 10 is further provided with an optional rigid stop 50 adapted to establish a maximum rotation about valve axis 44 when the valve is opened.

Figure 3:
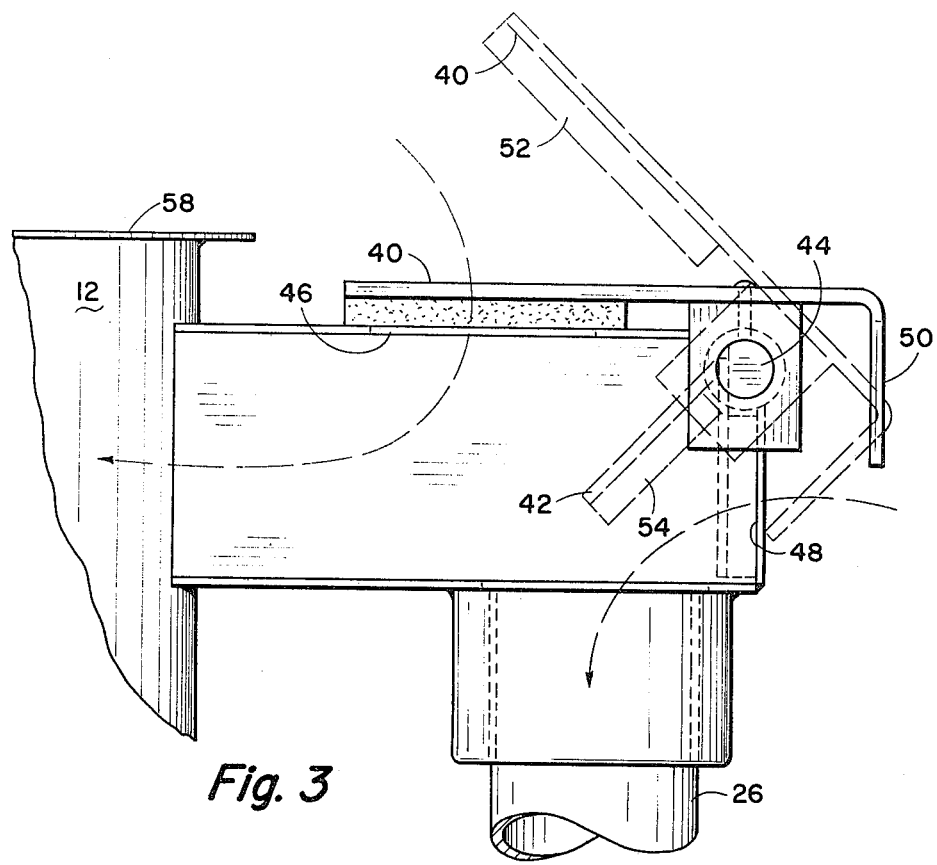
FIG. 3 is a side view of a valve system according to the present invention.
Figure 5:
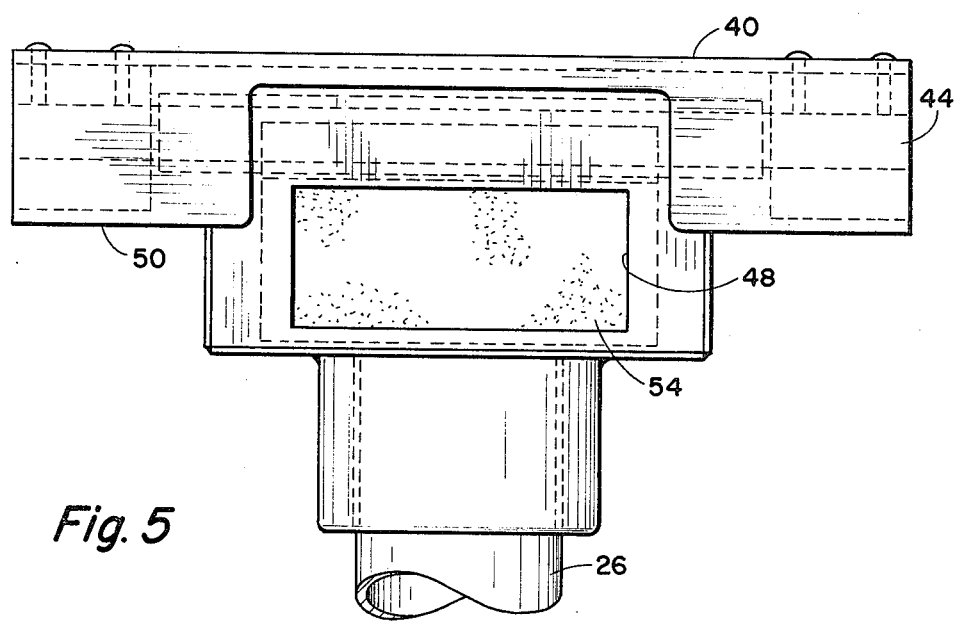
FIG. 5 is a front view of the valve system of FIGS. 3 and 4.
Figure 4:
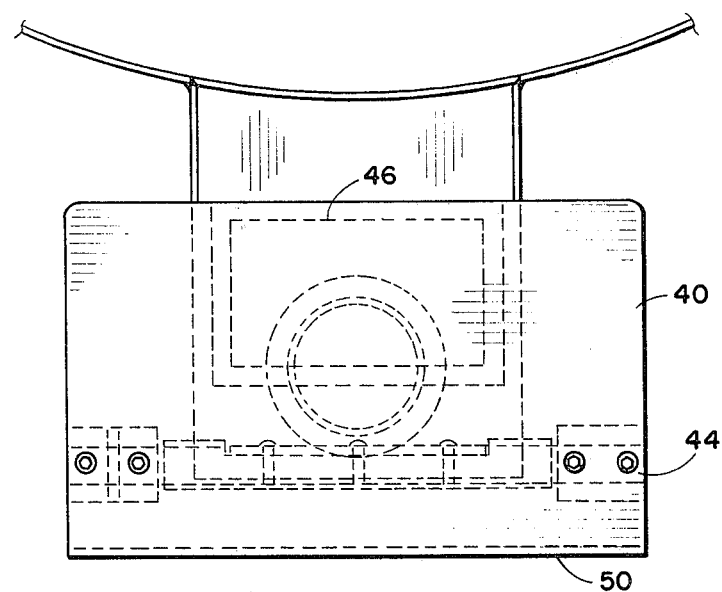
FIG. 4 is a top view of the valve system of FIG. 3.

In FIG. 3 the basic operation of the valve system 10 is shown by illustrating both the closed position "A" in solid lines and the totally open position "B" in phantom lines. The air from dust-free chamber 20 enters conduit 26 from left to right during operation and immediately takes a 90° turn downward toward the inlet side of exhauster (not shown). The valve axis 44 is located at the top right corner of conduit 26 and is mounted such that it is free to rotate. Rectangular openings 46 and 48 in conduit 26 (see FIGS. 4 and 5) allow atmospheric air to enter conduit 26. The resulting air surge entering the dust-free chamber 20 will be flowing in a direction opposite the air flow during use of the vacuum cleaner. The essentially rigid valve surfaces 40 and 42 are attached to valve axis 44 such that when the valve system is rotated to the closed position "A" gaskets 52 and 54 make essentially airtight seals around openings 46 and 48, respectively. When the valve system is rotated to the open position "B" stop 50 swings down to rest against the vertical outside wall of conduit 26. In this totally open position, internal valve surface 42 will bisect the 90° corner within conduit 26. In this manner the air entering opening 46 will be deflected toward the dust-free chamber 20 consequently reversing the flow of air through filter elements 22 (not shown). The air entering opening 48 will be deflected towards the inlet of exhauster 28 (not shown) thus isolating the exhauster from the system.

Figure 6:
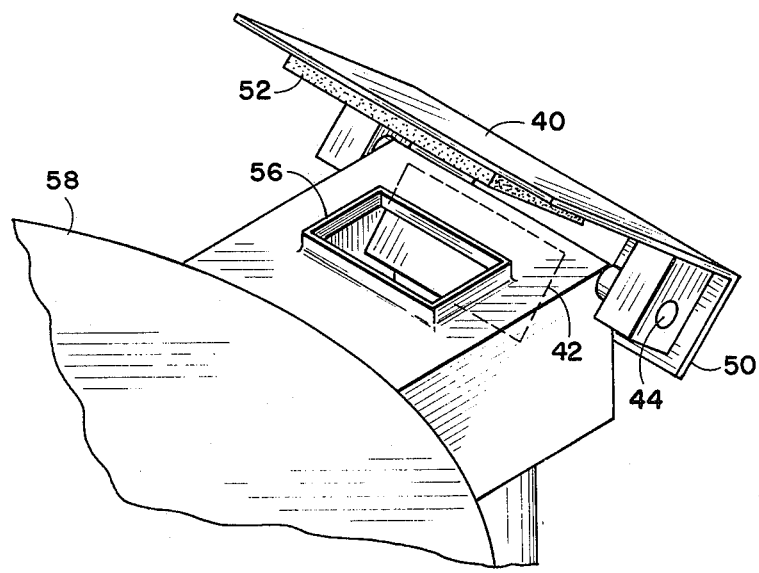
FIG. 6 is an isometric view of an alternate valve system illustrating raised lips about the openings.

As a further refinement of the present invention, FIG. 6 illustrates an alternate embodiment involving a raised lip 56 about the perimeter of each opening in the conduit. This raised lip 56 assists in ensuring an essentially airtight seal when the valve system is closed.

FIGS. 7 and 8 illustrate an alternate embodiment wherein the valve system is mounted in the top of the essentially flat lid 58 of the dust-free chamber. The inwardly pivoting valve surface 60 is positioned in front of the conduit 62 such that air entering the smaller opening 64 will be deflected towards the exhauster (not shown) by virtue of stop 66 holding valve surface 60 at approximately a 45° angle. FIG. 8 further illustrates an alternate knife edge sealing surface 68 which is particularly useful in certain hostile environments such as high temperatures or chemically corrosive applications.

In order to actuate the illustrated preferred valve system during operation of the vacuum cleaner, the operator merely places a finger or fingers under the overhanging valve surface 40 on either side and quickly lifts the valve surface 40 releasing the air seal (in the case of FIG. 7 quickly push down on stop 66). The force required to accomplish this task can be easily predetermined by selecting the appropriate surface areas of the respective openings. In principle the smaller the incremental difference in surface area between the opening associated with the externally pivoting valve surface and the opening associated with the internally pivoting valve surface, the smaller the force required to accomplish the task. Preferably a positive force should be required to open the valve system but it is possible to reverse the respective sizes of the openings thus requiring a positive force to hold the valve system closed during the operation of the vacuum cleaner. By selecting the appropriate difference in surface areas of the openings the actuating force can be maintained at a nominal value while the actual size of the openings can be relatively large. Thus, even powerful commercial vacuum cleaners can be manually activated with very large openings being employed.

In one prototype vacuum cleaner having approximately a 30 gallon tank evacuated by a 120 CFM exhauster driven by a 5 HP electric motor creating a pressure drop of approximately 7 inches Hg similar to the illustrated unit, it was discovered that a horizontal opening of about 7.00 square inches in combination with a vertical opening of about 3.75 square inches could be triggered manually with a physical motion reminiscent of snapping one's fingers. It was further observed that repeated flipping of the valve set up a poppet-type motion that would create a series of reverse air flow pulses which in turn would shake and dislodge accumulated dust from the filter elements.

As a further refinement, the design and shape of valve surfaces and openings can be tailored to optimize the air flow direction while the valve system is open. In particular the inwardly pivoting valve surface can be contoured to close off any desired degree of the interior cross-section of the conduit. In this manner, the actual force experienced at various angles of rotation can be controlled. Similarly, the size and mass of the valve surfaces can be selected to influence the force and rate of opening and closing. For example, the illustrated preferred embodiment will close under the influence of gravity as the pressure gradient across the open valve equilibrates with the atmosphere.

The particular method of actuating or activating the valve system can be generally any method known to the art and is not limited to manual triggering of the valve. Thus mechanical actuators, electrical solenoids, diaphragm activators, air flow or pressure-sensitive servo-systems, timers and the like can be employed to trip the valve. It should further be appreciated that the valve system herein disclosed is applicable to domestic as well as commercial units including portable as well as stationary installations.

Having thus described the invention with a certain degree of particularity, it is manifest that many changes can be made in the details of construction and arrangement of the components without departing from the spirit and scope of this disclosure. Therefore, it is to be understood that the invention is not limited to the embodiment set forth herein for purposes of exemplification, but is to be limited only by the scope of the attached claims, including a full range of equivalents to which each element thereof is entitled.

I claim:

1. In a vacuum cleaner having a dust-laden air chamber provided with an inlet for dust-laden air and communicating with a dust-free air chamber through a filter element wherein an exhauster communicating with said dust-free chamber through a conduit causes the air to be drawn through the filter element during operation, the improvement comprising a valve system for creating reverse pulses of air through the filter element, the valve system comprising:
   (a) a valve axis mounted to said conduit;
   (b) a pair of openings in said conduit on opposite sides of said mounted valve axis; and
   (c) a pair of essentially rigid valve surfaces mounted to pivot about said valve axis and to open and close said openings in a manner such that said openings are normally closed during operation of said vacuum cleaner and open when accumulated dust is to be removed from said filter element, said valve surfaces being interconnected so that when said openings are open one of said valve surfaces opens outwardly towards the exterior of said conduit against the pressure gradient existing between inside and outside of said conduit during operation of said vacuum cleaner and said other valve surface opens inwardly towards the interior of said conduit assisted by said pressure gradient so that air is admitted through said openings to provide a reverse pulse of air to remove the accumulated dust from said filter element.

2. The vacuum cleaner of claim 1 wherein said inwardly opening rigid valve surface is mounted to said valve axis on the side closest to said exhauster so as to direct air towards said exhauster when operated to open said pair of openings.

3. The vacuum cleaner of claim 1 or 2 wherein said rigid valve surfaces have a gasket layer attached thereto to promote an airtight seal.

4. The vacuum cleaner of claim 3 wherein said openings in said conduit have a raised lip to further promote an airtight seal.

5. The vacuum cleaner of claim 2 wherein said conduit bends through an angle and said valve axis is mounted at the outer edge of said angle such that said pair of rigid valve surfaces are not coplanar.

6. The vacuum cleaner of claim 5 wherein said angle is about 90° with said outwardly pivoting rigid valve surface being essentially horizontal when said openings are closed.

7. The vacuum cleaner of claim 6 wherein said rigid valve surfaces have a gasket layer attached thereto to promote an airtight seal.

8. The vacuum cleaner of claim 7 wherein said openings in said conduit have a raised lip to further promote an airtight seal.

9. In a vacuum cleaner having a dust-laden air chamber provided with an inlet for dust-laden air and communicating with a dust-free air chamber through a filter element wherein an exhauster communicating with said dust-free chamber through a conduit causes the air to be drawn through the filter element during operation, the improvement comprising a valve system for creating reverse pulses of air through the filter element, the valve system comprising:
   (a) a valve axis mounted to said dust-free air chamber;
   (b) a pair of openings in said dust-free air chamber on opposite sides of said mounted valve axis; and
   (c) a pair of essentially rigid coplanar valve surfaces mounted to pivot about said valve axis and to open and close said openings in a manner such that said openings are normally closed during operation of said vacuum cleaner and open when accumulated dust is to be removed from said filter element, said valve surfaces being interconnected so that when said openings are open one of said valve surfaces opens outwardly towards the exterior of said dust-free air chamber against the pressure gradient existing between inside and outside of said dust-free air chamber during operation of said vacuum cleaner and said other valve surface opens inwardly towards the interior of said dust-free air chamber assisted by said pressure gradient so that air is admitted through said openings to provide a reverse pulse of air to remove the accumulated dust from said filter element.

10. A method for removing the accumulated dust from the filter element in the vacuum cleaner of claim 1, 2, 6 or 9 during operation comprising the steps of opening and closing the openings in the manner recited therein.

* * * * *